(12) United States Patent
Onozawa

(10) Patent No.: US 7,671,918 B2
(45) Date of Patent: Mar. 2, 2010

(54) CAMERA WITH AUTOFOCUS FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1020 days.

(21) Appl. No.: 11/364,593

(22) Filed: Feb. 28, 2006

(65) Prior Publication Data

US 2006/0204122 A1 Sep. 14, 2006

(30) Foreign Application Priority Data

Mar. 8, 2005 (JP) .............................. 2005-064279

(51) Int. Cl.
*H04N 5/232* (2006.01)
*G03B 13/00* (2006.01)
*G03B 17/00* (2006.01)

(52) U.S. Cl. ...................... 348/345; 348/346; 348/349; 396/79

(58) Field of Classification Search ............ 348/333.01, 348/333.02, 345, 346, 349, 353; 396/79, 396/80

See application file for complete search history.

(56) References Cited

U.S. PATENT DOCUMENTS

2003/0193600 A1* 10/2003 Kitamura et al. ....... 348/333.01

FOREIGN PATENT DOCUMENTS

JP 2004-221650 A 8/2004

* cited by examiner

*Primary Examiner*—Kelly L Jerabek
(74) *Attorney, Agent, or Firm*—Frishauf, Holtz, Goodman & Chick, P.C.

(57) ABSTRACT

A camera includes a first transfer unit which transfers, in a first transfer time, pixel data of a first pixel range of a plurality of pixel data, a second transfer unit which transfers, in a second transfer time that is shorter than the first transfer time, pixel data of a second pixel range of the plurality of pixel data, a number of pixels of the second pixel range being less than a number of pixels of the first pixel range, a first control unit which causes the first transfer unit to transfer the pixel data, updates a display screen on the basis of the pixel data, and controls the autofocus adjustment, and a second control unit which causes the second transfer unit to transfer the pixel data, interrupts the updating of the display screen while the pixel data is being transferred, and controls the autofocus adjustment.

7 Claims, 9 Drawing Sheets

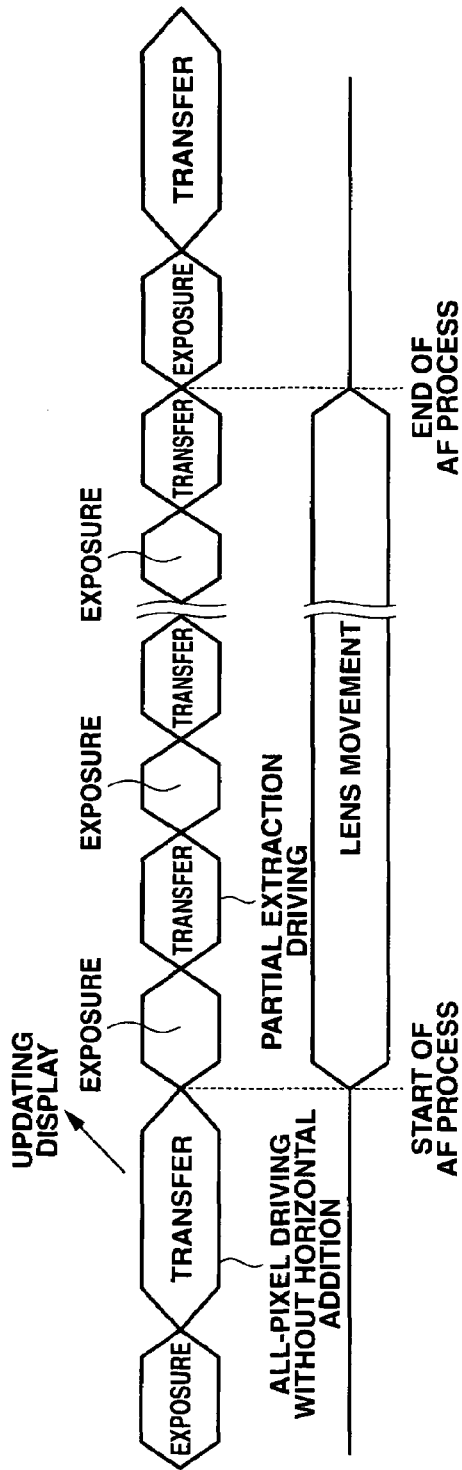
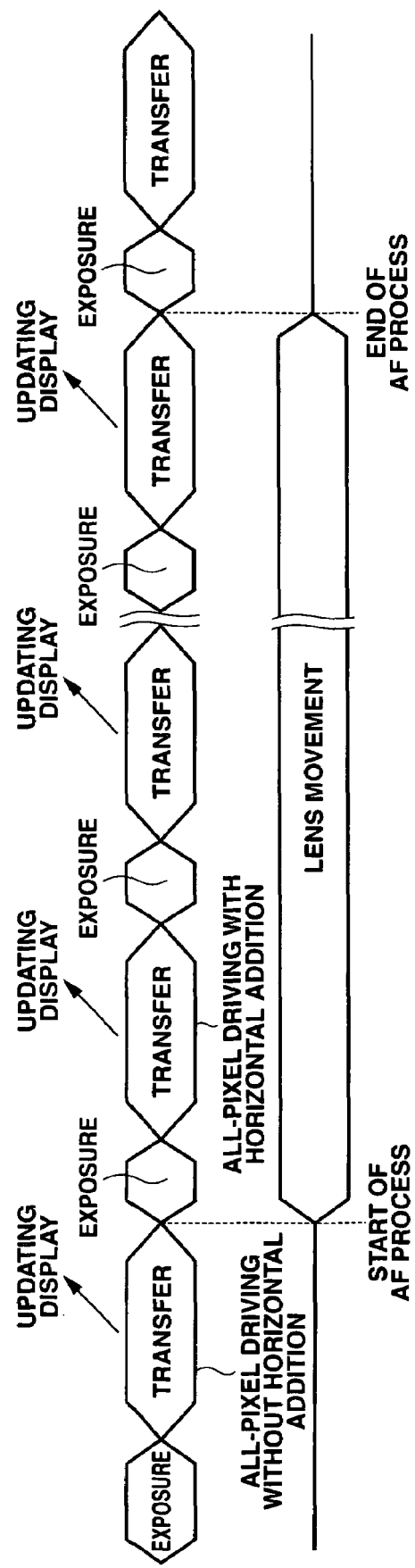
FIG.7A
FIG.7B

CAMERA WITH AUTOFOCUS FUNCTION

CROSS-REFERENCE TO RELATED APPLICATIONS

This application is based upon and claims the benefit of priority from prior Japanese Patent Application No. 2005-064279, filed Mar. 8, 2005, the entire contents of which are incorporated herein by reference.

BACKGROUND OF THE INVENTION

1. Field of the Invention

The present invention relates to a camera with an autofocus function, and an autofocus control method.

2. Description of the Related Art

In general, a digital camera is provided with an autofocus (AF) function. For example, in accordance with a photographer's half-push operation on the shutter button, focusing on a subject can automatically be made. An example of the method of the AF function is a contract method in which autofocus is made by making use of pixel data that is acquired from an image capturing device (e.g. charge-coupled device (CCD)).

In the AF process by the contrast method, a contrast of an image is detected on the basis of pixel data that is obtained by imaging a subject. By moving the focusing lens to a lens position where the contrast value takes a maximum value, focusing on the subject can be effected. This contrast method is characterized in that when the image of the subject is in a blurring state, the contrast of the image is low, and the contrast value gradually increases as the image of the image becomes closer to the in-focus state, and the contrast value takes a maximum value when the image is in the in-focus state.

In the AF process, the following control is executed. That is, while the focus lens is being driven with a predetermined pitch, the contrast value is detected on the basis of pixel data that is acquired at each of lens positions. The lens position, at which the contrast takes a peak value, is determined to be the in-focus position of the focusing lens, and the focusing lens is moved to the in-focus position.

In general, AF processes using the contrast method fall into two categories: a method in which only a central part of pixel data obtained by the CCD is extracted and upper and lower parts of the pixel data are cut off, and a method by through-image driving, in which the entire pixel data is normally used.

In the former method, an incomplete image, in which upper and lower parts of the entire pixel data are cut off, is acquired during the AF process. Thus, a through-image (display screen for confirming a subject), which is used as an electronic view-finder image, cannot be displayed. Under the circumstances, during the AF operation, a black screen is being displayed, or a still image, which is acquired prior to the start of the AF operation, is being displayed. In this case, there is such an advantage that the transfer amount of pixel data is reduced since only a part of the entire pixel data is extracted and transferred, and thus the frame rate can be increased and a high-speed AF process is realized.

On the other hand, in the latter method, unlike the former method, there is an advantage that the AF process can be executed while the through-image is being displayed. However, since it is necessary to acquire the entire pixel data, the data transfer amount is large, and the frame rate cannot be increased. The time that is needed for the AF process becomes longer than in the former method.

In the prior art, there has been proposed an electronic camera wherein the speed of the AF control is increased and the preview display at the time of the AF control is made proper (Jpn. Pat. Appln. KOKAI Publication No. 2004-221650). In this prior-art digital camera, the CCD image-capturing device is switched between a draft mode in which a relatively large number of pixels are read out, and an autofocus mode in which pixels can be read out at a relatively high speed. At the time of the AF control, the AF control is executed on the basis of an image that is read out in the autofocus mode, thereby achieving high-speed AF (autofocus). In addition, making use of the image that is read out in the autofocus mode, the amount of movement (vector) of the subject is detected. On the basis of the detected amount of movement and the image that is read out in the draft mode prior to the transition to the autofocus mode, an image for display is generated and the generated image for display is displayed on, for instance, a liquid crystal display (LCD).

In the prior-art digital camera, however, in the case where the high-speed AF process is to be executed, a through-image cannot be displayed. On the other hand, in the case where a through-image is to be displayed during the AF process, the time that is needed for the AF process becomes longer.

BRIEF SUMMARY OF THE INVENTION

According to an aspect of the present invention, there is provided a camera which executes autofocus adjustment using pixel data acquired from an image capturing device, comprising: a first transfer unit (CCD 12) which transfers, in a first transfer time, pixel data of a first pixel range of a plurality of pixel data that are acquired by exposure of the image capturing device; a second transfer unit (CCD 12) which transfers, in a second transfer time that is shorter than the first transfer time, pixel data of a second pixel range of the plurality of pixel data that are acquired by exposure of the image capturing device, a number of pixels of the second pixel range being less than a number of pixels of the first pixel range; a first control unit (realized by a CPU in controller 25 that operates according to a control program stored in a memory in the controller 25) which causes the first transfer unit to successively transfer the pixel data, successively updates a display screen for conformation of a subject on the basis of the pixel data that is successively transferred by the first transfer unit, and controls the autofocus adjustment on the basis of the pixel data that is successively transferred by the first transfer unit; a second control unit (realized by the CPU in controller 25 that operates according to the control program stored in the memory in the controller 25) which causes the second transfer unit to successively transfer the pixel data, interrupts the updating of the display screen for the conformation of the subject while the pixel data is being transferred by the second transfer unit, and controls the autofocus adjustment on the basis of the pixel data that is successively transferred by the second transfer unit; and a control determination unit (realized by the CPU in controller 25 that operates according to the control program stored in the memory in the controller 25) which determines whether the autofocus adjustment is to be controlled by the first control unit or the second control unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7A and FIG. 7B are views for explaining image capturing conditions in a case where a lens movement time is determined to be shorter than a data transfer time by the partial extraction driving, and in a case where the lens movement time is determined to be not shorter than the data transfer time by the partial extraction driving;

DETAILED DESCRIPTION OF THE INVENTION

Embodiments of the present invention will now be described with reference to the accompanying drawings.

Figure 1:
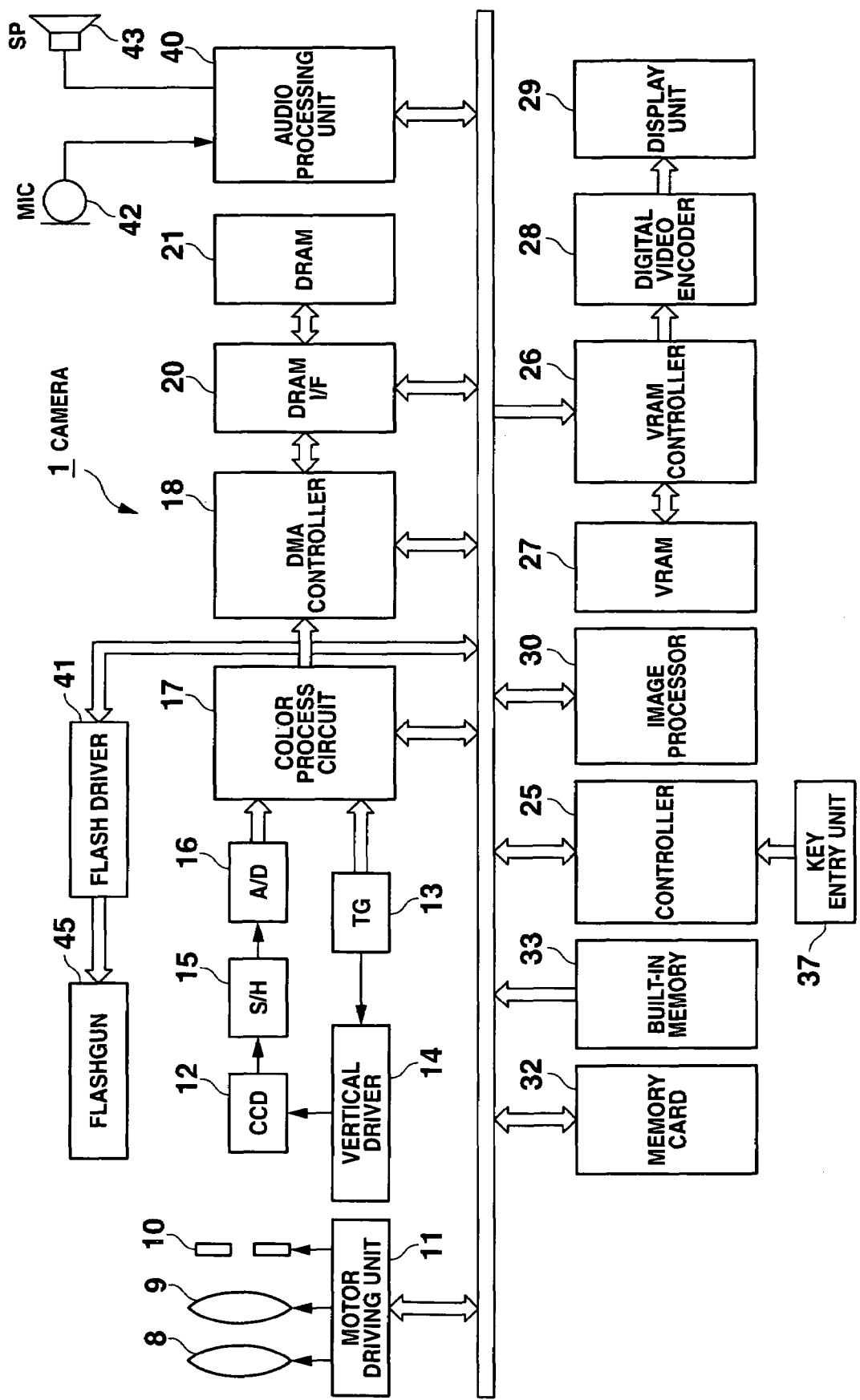
FIG. 1 is a block diagram that shows a detailed structure of a camera 1 according to embodiments (first embodiment and second embodiment) of the present invention.

FIG. 1 is a block diagram that shows a detailed structure of a camera 1 according to embodiments (first embodiment and second embodiment) of the present invention.

In the camera 1 shown in FIG. 1, in an image capturing mode that is the basic mode, a focusing lens 8, a zoom lens 9 and an aperture stop 10, which are included in a lens optical system, are shifted to an aperture stop position or a lens position corresponding to image-capturing by a motor that is driven by a motor driving unit 11 under the control of a controller 25.

A CCD (Charge Coupled Device) 12, which is an image capturing device disposed on a back side along the image-capturing optical axis of the lens optical system, is scan-driven by a timing generator (TG) 13 and a vertical driver 14 to output a frame of a photoelectrical conversion output which corresponds to a focused image in every predetermined cycle.

The photoelectrical conversion output is subjected to gain adjustment for each of the primary colors R, G and B in the form of analog signals, then sampled and held in a sample and hold (S/H) circuit 15, converted to digital data in an A/D converter 16, and subjected to color processing including an automatic exposure (AE) control, a color correction control such as automatic white balance adjustment, pixel interpolation and gamma correction in a color processing circuit 17, thereby producing digital brightness and color difference signals Y, Cb and Cr. The resulting digital signals are output to a DMA (Direct Memory Access) controller 18.

The DMA controller 18 temporarily writes the brightness signal Y and the color difference signals Cb and Cr from the color processing circuit 17 into its buffer and then DMA transfers them through a DRAM interface (I/F) 20 to a DRAM 21 as a buffer memory, using a composite sync signal, a memory write enable signal and a clock signal from the color processing circuit 17.

The controller 25 includes a CPU, a ROM that stores operation programs to be executed by the CPU and data in a fixed fashion, and a RAM that is used as a work memory. The controller 25 executes an overall control of the camera 1. The operation programs include an autofocus control program for controlling autofocus (AF), and an auto-exposure control program for auto-exposure (AE).

After the DMA transfer of the brightness and color difference signals to the DRAM 21, the controller 25 reads these signals through the DRAM interface 20 from the DRAM 21 and then writes them via a VRAM controller 26 into a VRAM 27.

A digital video encoder 28 periodically reads the brightness and color difference signals through the VRAM controller 26 from the VRAM 27 and produces a video signal on the basis of those signals. The video signal is then output to a display unit 29.

The display unit 29 serves as a monitor display unit (electronic view-finder) in the capture mode and executes display based on the video signal from the digital video encoder 28. Thereby, an image (through-image) based on image information from the VRAM controller 26 is displayed in real time on the display unit 29.

In a display state in which a trough-image is displayed in real time on the display unit 29, when a shutter key in a key entry unit 37 is operated at a time a still image is captured, a trigger signal is produced.

In response to this trigger signal, the controller 25 stops the driving of the CCD 12 and then carries out an automatic exposure process to obtain proper exposure values. Thereby, the aperture stop of the lens optical system and the exposure time of the CCD 12 are controlled and then an image capture is carried out anew.

A frame of image data thus obtained is DMA transferred to and written into the DRAM 21. The controller 25 then reads one frame of image data written in the DRAM 21 and writes it into an image processor 30 where the input pixel data is JPEG (Joint Photographic Experts Group) encoded.

The JPEG-encoded image data is written into a removably attached nonvolatile memory card 32 as a recording medium of the camera 1 or into a built-in nonvolatile memory 33 when the memory card 32 is not loaded into the camera 1.

Upon completion of writing of one frame of image data into the memory card 32 or the built-in memory 33, the controller 25 resumes monitor display of a through-image, which is obtained from the CCD 12 via the DRAM 21, on the display unit 29.

The key entry unit 37, an audio processing unit 40 and a flash driver 41 are connected to the controller 25.

The key entry unit 37 includes a power key, the shutter key, a mode change key, a menu key, a select key, a zoom button, and a cursor control key. The signals resulting from operations of those keys are directly fed into the controller 25.

The audio processing unit 40 includes a sound source circuit, such as a PCM sound source. At the sound recording time, the audio processing unit digitizes an audio signal input from a microphone (MIC) 42 and compresses the digital audio signal according to a predetermined file format, such as MP3 (MPEG-1 Audio Layer-3), to create an audio data file. The data file is sent to the memory card 32 or the built-in memory 33. At the time of audio reproduction, an audio data file from the memory card 32 or the built-in memory 33 is decompressed and converted to an analog signal to drive a loudspeaker (SP) 43.

Further, the audio processing unit 40, under the control of the controller 25, produces various operation sounds, such as a pseudo-shutter sound associated with an operation of the shutter key, beeps associated with operations of the other keys, etc., from the loudspeaker 43.

The flash driver 41 charges up a large-capacitance capacitor (not shown) connected to a flashgun 45 at still image capture time and then causes the flashgun to emit a flash of light under the control of the controller 25.

FIRST EMBODIMENT

In a first embodiment of the invention, in a case where the exposure time may be short because the brightness of a subject is high, "partial extraction driving" (i.e. a driving mode in which only a part of pixel data is extracted and used for an autofocus (AF) process) is performed to execute a high-speed AF process. On the other hand, when the brightness of the subject is low and a long exposure time is needed, the time that is needed to carry out the AF process cannot be decreased and thus "through-driving", in which all pixel data is used, is performed. Under the image capturing condition in which the high-speed AF process is enabled, the AF process is quickly completed. Under the image capturing condition in which the high-speed AF process cannot be executed, a through-image is displayed, and thereby a photographer is provided with a screen which follows the movement of the subject.

A description will now be given of the operation of controlling data transfer from the CCD 12, which is switched in accordance with the difference in the image capturing condition in the first embodiment.

Figure 3:
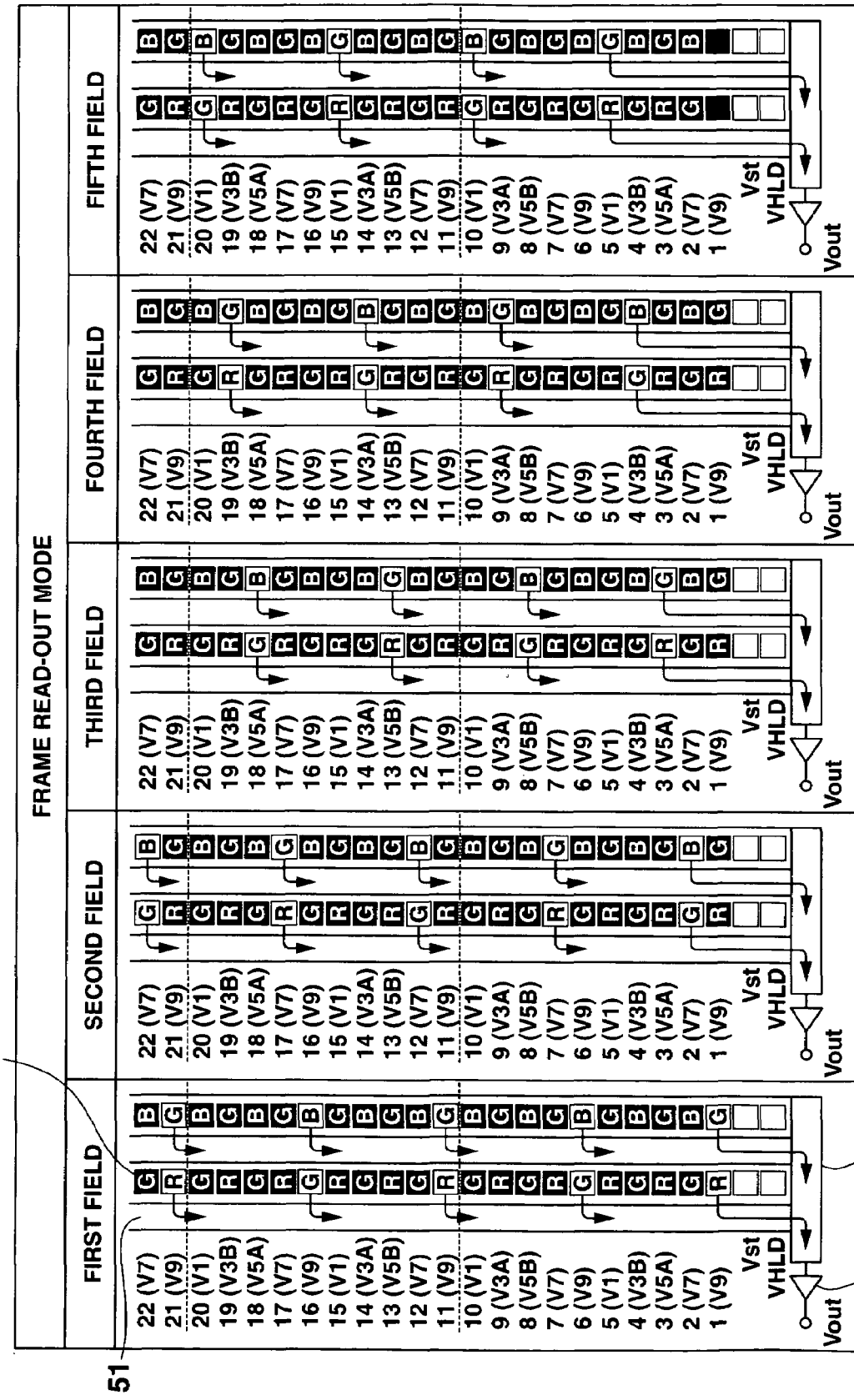
FIG. 3 illustrates a transfer control operation of pixel data from a CCD 12 at a time of capturing a still image.

FIG. 3 illustrates a transfer control operation of pixel data from the CCD 12 at a time of capturing a still image. The CCD 12 is configured to transfer all pixel data by dividing a frame into five fields. As is shown in FIG. 3, the CCD 12 includes photodiodes 50 as light-receiving elements, which are arranged in a matrix. A plurality of vertical CCDs 51 are vertically arranged between the photodiodes 50. A single horizontal CCD 52 is horizontally disposed at one end of the vertical CCDs 51. Signal charges, which are accumulated in the photodiodes 50, are read out to the associated vertical CCDs 51 in response to pulses which are supplied from the timing generator (TG) 13 via the vertical driver 14. The read-out signal charges are transferred through the vertical CCDs 51 toward the horizontal CCD 52. The signal charges, which are transferred through the vertical CCDs 51, are then transferred through the horizontal CCD 52. The signal charges are transferred toward an amplifier 53 through the horizontal CCD 52 and are output from the amplifier 53.

Figure 4:
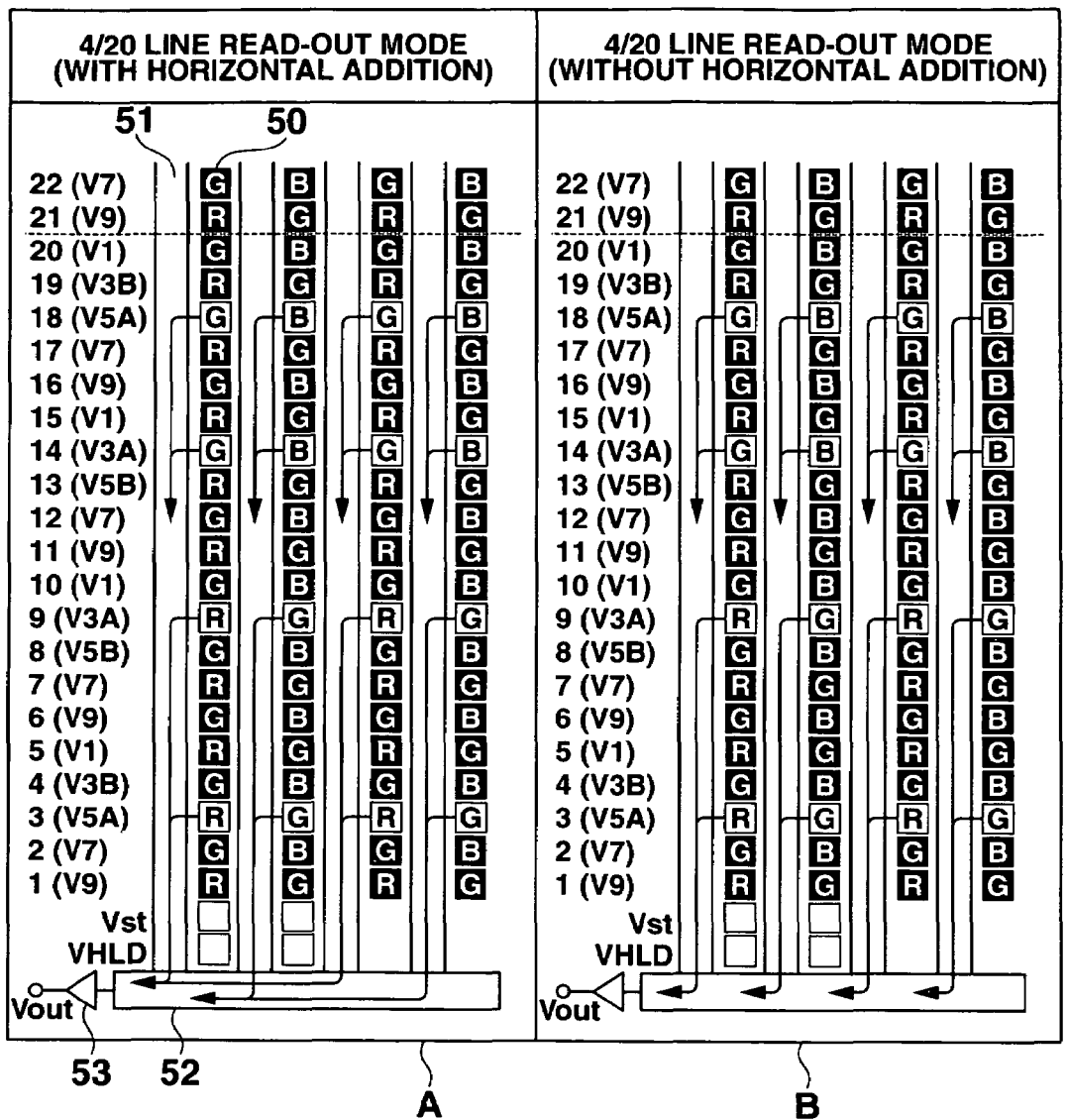
FIG. 4 illustrates a 4/20 line read-out mode (without horizontal addition), which is a scheme for displaying an ordinary through-image, and a 4/20 line read-out mode (with horizontal addition) which enables display of a high-speed through-image during the AF process.

Part B of FIG. 4 illustrates an operation of a 4/20 line read-out mode (without horizontal addition) for displaying an ordinary through-image, and part A of FIG. 4 illustrates an operation of a 4/20 line read-out mode (with horizontal addition) which enables high-speed through-image display in an AF process.

As is shown in part B of FIG. 4, in the 4/20 line read-out mode (without horizontal addition), the pixels are thinned to 1/5 in the horizontal direction, and every two vertical pixels are added in the horizontal CCD 52. As a result, the amount of data, which is output from the CCD 12, is reduced to 1/10, compared to the still image capturing mode illustrated in FIG. 3. Accordingly, data transfer with a frame speed of 30 fps can be executed (transfer with a third transfer time).

As is shown in part A of FIG. 4, in the 4/20 line read-out mode (with horizontal addition), the pixels are thinned to 1/5 in the horizontal direction, and every two vertical pixels and every two horizontal pixels are added in the horizontal CCD 52. That is, every four pixels are added. As a result, the amount of data, which is output from the CCD 12, is reduced to 1/20, compared to the still image capturing mode illustrated in FIG. 3. Accordingly, data transfer with a high frame speed of 60 fps can be executed (transfer with a first transfer time).

Figure 5:
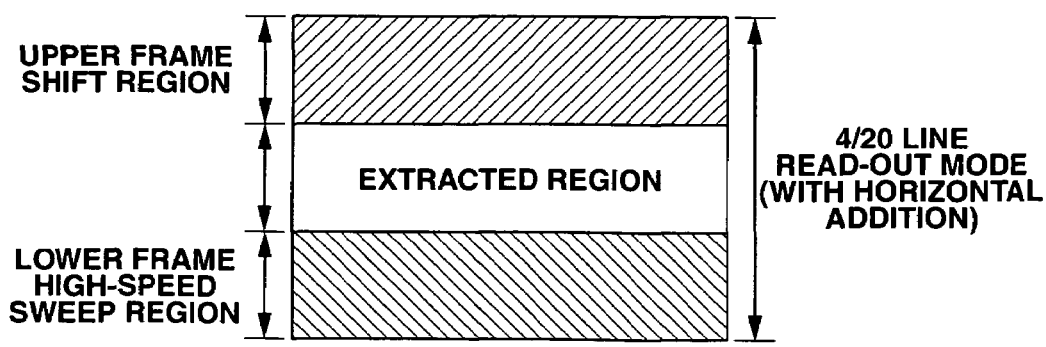
FIG. 5 illustrates partial extraction driving, which is used in order to execute the AF process at high speed.

FIG. 5 illustrates the concept of the partial extraction driving, which is used in order to execute the AF process at high speed. In the partial extraction driving, only the pixel data in lines (data extraction region) in the focus area at the time of autofocus (AF) is extracted from the CCD 12 by, e.g. the 4/20 line read-out mode (with horizontal addition). Driving for high-speed sweep is executed with respect to a lower frame region below the data extraction region. On the other hand, with respect to an upper frame region above the data extraction region, driving for sweeping charge to the substrate by frame-shift is executed. Thus, the data that is output from the CCD 12 is limited to the lines in the focus area, and high-speed transfer of 120 fps or more (transfer with a second transfer time) can be realized, and the AF process can be carried out at high speed.

According to the camera 1 of this embodiment, the above-described driving methods (i.e. pixel data transfer control methods) are switched in accordance with the image capturing condition. Thereby, the AF process with priority on the AF speed, in which the AF process can quickly be completed, or the AF process with priority on display of a through-image, can be executed.

Figure 2:
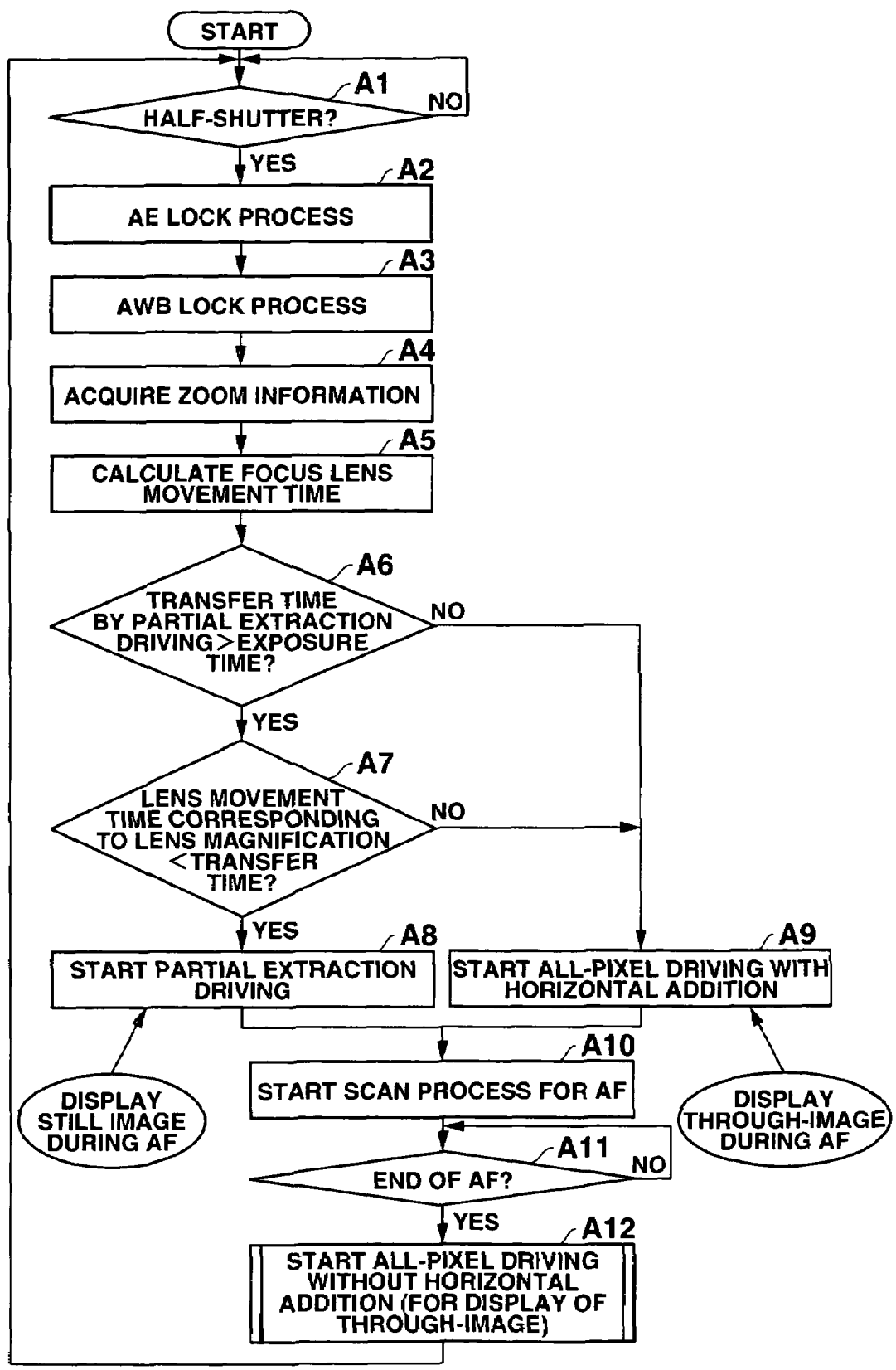
FIG. 2 is a flow chart for describing an AF process operation in the first embodiment.

Next, the AF process operation of the first embodiment is described with reference to a flow chart of FIG. 2.

To start with, the photographer operates the shutter key of the key entry unit 37. If half-push (half-shutter) is detected (step A1), the controller 25 causes the color process circuit 17 to execute a color correction process, and locks respective execution values for auto-exposure (AE) and automatic white balance adjustment (AWB). Then, the controller 25 stands by for image capturing (steps A2 and A3).

The controller 25 acquires zoom information, which is indicative of the current position of the zoom lens 9, and stores it (step A4). Based on the zoom information, the controller 25 calculates a movement time of the focusing lens 8, which corresponds to a zoom magnification (step A5).

In the camera 1 of this embodiment, the contrast method is used for the AF process. In the AF process using the contrast method, while the focusing lens 8 is being moved, the contrast value is detected on the basis of pixel data which is obtained when the focusing lens 8 reaches a plurality of positions that are determined under predetermined conditions, that is, lens positions with a predetermined pitch (intervals for detection) for obtaining the focusing precision corresponding to the zoom magnification. The lens position, at which the contrast value takes a maximum value, is determined as an in-focus position of the focusing lens 8. In this example, the time of movement of the focusing lens 8, which corresponds to the detection intervals of the contrast value that is needed in order to determine the in-focus position with predetermined focus precision in the AF process, is calculated. For example, the distance of movement of the focusing lens 8, which is needed in order to move the focus position from 50 cm to infinite, becomes greater as the focusing lens 8 is located at a lens position with a higher zoom magnification (Tele-end side) and becomes smaller as the focusing lens 8 is located at a lens position with a lower zoom magnification (Wide-end side). Accordingly, the distance of movement of the focusing lens 8, which corresponds to the detection interval of the contrast value for obtaining a focusing precision corresponding to the zoom magnification, becomes longer as the focusing lens 8 is located on a lens position with a higher zoom magnification and becomes shorter as the focusing lens 8 is located on a lens position with a lower zoom magnification. Hence, the time of movement, which corresponds to the detection interval of the focusing lens 8, varies accordingly.

The controller 25 compares the exposure time, which is the execution value locked in the AE lock process in step A2, with a preset determination value (first preset time). In this example, the determination value is set in accordance with a transfer time in a case where pixel data is transferred from the CCD 12 by the partial extraction driving, and it is determined whether the exposure time is less than the data transfer time by the partial extraction driving (step A6).

Figure 6A:
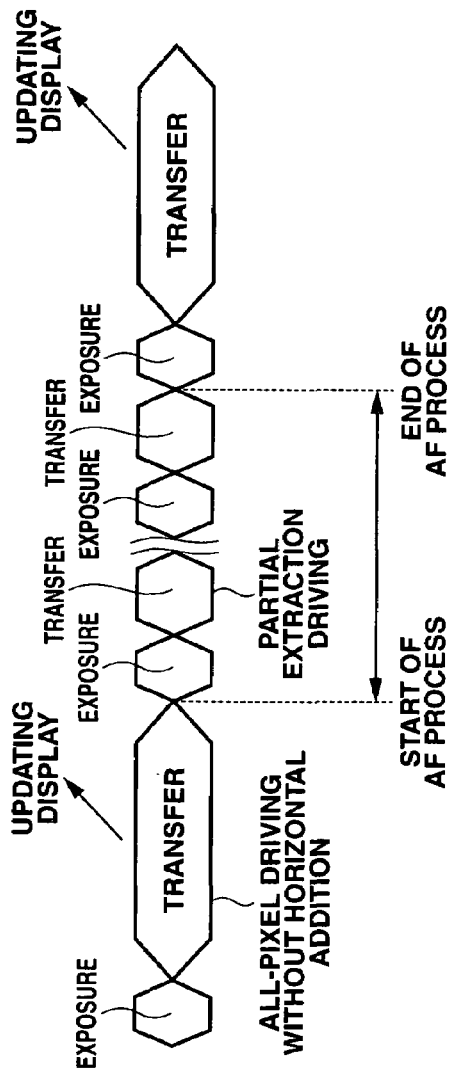
FIG. 6A and FIG. 6B are views for explaining image capturing conditions in a case where an exposure time is determined to be shorter than a data transfer time by the partial extraction driving, and in a case where the exposure time is determined to be not shorter than the data transfer time by the partial extraction driving.
Figure 6B:
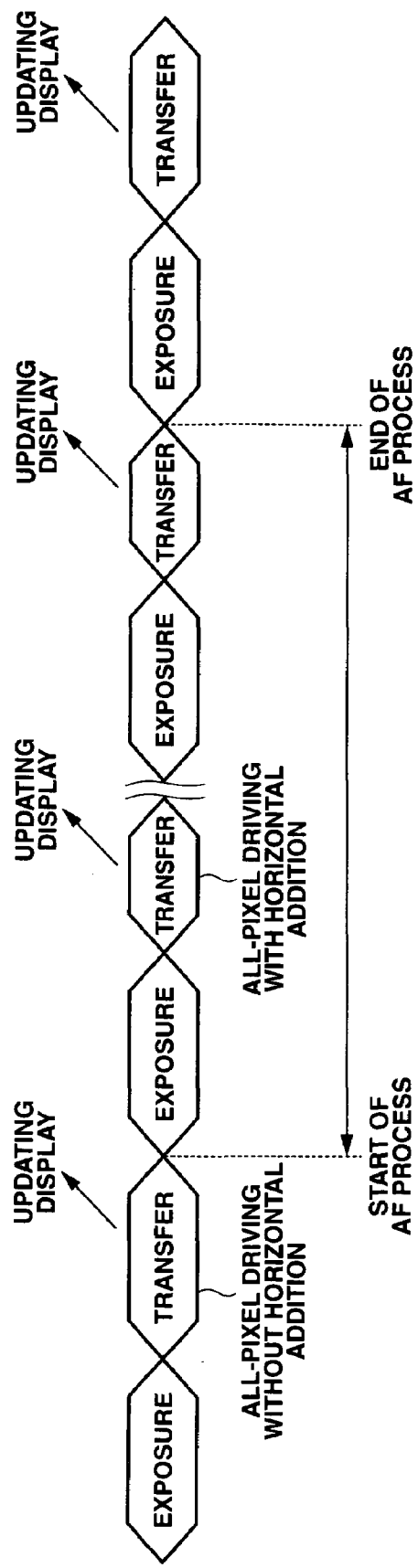

FIG. 6A shows a case where the exposure time is determined to be shorter than the data transfer time by the partial extraction driving, and FIG. 6B shows a case where the exposure time is determined to be not shorter than the data transfer time by the partial extraction driving.

As is shown in FIG. 6A, when the exposure time is shorter, the transfer time of pixel data is decreased. Thereby, the time that is needed to complete the AF process, that is, from the start of the AF process to the end of the AF process, can be shortened. Thus, before the AF process is started, pixel data is transferred by the all-pixel driving without horizontal addition, in order to display the through-image. After the AF process is started, the data transfer is executed by the partial extraction driving. By this driving control, the data amount can be reduced and the time that is needed for the data transfer is decreased. Thereby, the time that is needed for the AF process can be decreased.

In the case of the data transfer by the partial extraction driving, the through-image cannot be displayed in the AF process. However, since the time that is needed until the end of the AF process is short, there arises no problem in operation with the photographer.

On the other hand, as shown in FIG. 6B, in the case where the exposure time is not shorter than the data transfer time by the partial extraction driving, even if the transfer time of pixel data is decreased, it is not possible to shorten the time that is needed to complete the AF process, that is, from the start to end of the AF process. Thus, before the AF process is started, the pixel data is transferred by the all-pixel driving without horizontal addition, in order to display the through-image. Even after the AF process is started, the data transfer is executed by the all-pixel driving with horizontal addition, in order to continue the display of the through-image. By executing the all-pixel driving with horizontal addition, the time needed for data transfer can be made shorter than in the case of the all-pixel driving without horizontal addition.

The data transfer by the all-pixel driving with horizontal addition requires a longer time than the data transfer by the partial extraction driving. However, since the display of the through-image is always updated during the AF process, no problem arises in operation with the photographer even if a certain length of time is needed until the end of the AF process.

If it is determined that the exposure time is not shorter than the data transfer time by the partial extraction driving (No in step A6), the controller 25 executes a control to cause the CCD 12 to start the all-pixel driving with horizontal addition (the 4/20 line read-out mode (with horizontal addition) illustrated in part A of FIG. 4) (step A9).

The controller 25 starts the AF process and causes the CCD 12 to start a scan process for AF (step A10). In the AF process using the contrast method, while the focusing lens 8 is being driven with a predetermined pitch, the contrast value is detected on the basis of pixel data that is acquired at respective lens positions. The lens position, at which the contrast value takes a peak value, is detected as the in-focus position of the focusing lens 8.

In this AF process, the data transfer by the all-pixel driving with horizontal addition is executed. Thus, as shown in FIG. 6B, the VRAM 27 is updated on the basis of the pixel data acquired at the respective lens positions, and the through-image is continuously displayed on the display unit 29.

If the AF process by the contrast method is completed (Yes in step A11), the controller 25 executes a control to cause the CCD 12 to start the all-pixel driving without horizontal addition (4/20 line read-out mode (without horizontal addition) illustrated in part B of FIG. 4) (step A12). Thus, the normal through-image is always displayed.

On the other hand, if it is determined that the exposure time is shorter than the data transfer time by the partial extraction driving (Yes in step A6), the controller 25 further compares the time of movement of the focusing lens 8 corresponding to the zoom magnification, which is calculated in step A5, with a preset determination value (second preset value). In this case, like the determination value which is compared with the exposure time, the determination value is set in accordance with the transfer time in a case where the pixel data is transferred from the CCD 12 by the partial extraction driving. The controller 25 determines whether the lens movement time is shorter than the data transfer time by the partial extraction driving (step A7).

FIG. 7A shows a case where the lens movement time is determined to be shorter than the data transfer time by the partial extraction driving, and FIG. 7B shows a case where the lens movement time is determined to be not shorter than the data transfer time by the partial extraction driving. FIG. 7A and FIG. 7B conceptually illustrate the differences in time that is needed for the entire AF process, which result from differences in lens movement time. In FIGS. 7A and 7B, the exposure time, transfer time and lens movement time do not represent actual physical times.

In the case where the lens movement time is shorter, as shown in FIG. 7A, the transfer time of pixel data is shortened and thereby the time that is needed for the entire AF process, that is, from the start to the end of the AF process, can be reduced. Before the AF process is started, the pixel data is transferred by the all-pixel driving without horizontal addition, in order to display the through-image. After the AF process is started, such a driving control is executed as to perform data transfer by the partial extraction driving. Thus, the data amount is reduced and the time for the data transfer is shortened. Thereby, the time that is needed for the entire AF process can be reduced.

In the case of the data transfer by the partial extraction driving, the through-image cannot be displayed during the AF process. However, since the time that is needed until the end of the AF process is short, there arises no problem in operation with the photographer.

On the other hand, in the case where the lens movement time is not shorter than the data transfer time by the partial extraction driving, even if the transfer time of pixel data is decreased, it is not possible to shorten the time that is needed to complete the AF process, that is, from the start to end of the AF process. Thus, as shown in FIG. 7B, before the AF process is started, the pixel data is transferred by the all-pixel driving without horizontal addition, in order to display the through-image. Even after the AF process is started, the data transfer is executed by the all-pixel driving with horizontal addition, in order to continue the display of the through-image. By executing the all-pixel driving with horizontal addition, the time needed for data transfer can be made shorter than in the case of the all-pixel driving without horizontal addition.

The data transfer by the all-pixel driving with horizontal addition requires a longer time than the data transfer by the partial extraction driving. However, since the display of the through-image is always updated during the AF process, no problem arises in operation with the photographer even if a certain length of time is needed until the end of the AF process.

If it is determined that the lens movement time is not shorter than the data transfer time by the partial extraction driving (No in step A7), the controller 25 executes a control to cause the CCD 12 to start the all-pixel driving with horizontal addition (the 4/20 line read-out mode (with horizontal addition) illustrated in part A of FIG. 4), as shown in FIG. 7B (step A9).

The controller 25 starts the AF process and causes the CCD 12 to start a scan process for AF (step A10). In the AF process using the contrast method, while the focusing lens 8 is driven with a predetermined pitch, the contrast value is detected on the basis of pixel data that is acquired at respective lens positions. The lens position, at which the contrast value takes a peak value, is detected as the in-focus position of the focusing lens 8.

In this AF process, the data transfer by the all-pixel driving with horizontal addition is executed. Thus, as shown in FIG. 7B, the VRAM 27 is updated on the basis of the pixel data acquired at the respective lens positions, and the through-image is continuously displayed on the display unit 29.

On the other hand, if it is determined that the lens movement time is shorter than the data transfer time by the partial extraction driving (Yes in step A7), the controller 25 executes a control to cause the CCD 12 to start the partial extraction driving (step A8).

The controller 25 starts the AF process by the contrast method, in the same manner as described above, and causes the CCD 12 to start the scan process for AF (step A10).

If the AF process by the contrast method is completed (Yes in step A11), the controller 25 executes a control to cause the CCD 12 to start the all-pixel driving without horizontal addition (4/20 line read-out mode (without horizontal addition) illustrated in part B of FIG. 4) (step A12). Thus, the normal through-image is always displayed.

As has been described above, in the first embodiment, when the focus adjustment is performed by the AF process using the contrast method, it is possible to execute either the operation with priority on the reduction in time necessary for the AF process (autofocus adjustment), that is, the control for executing the data transfer by the partial extraction driving, or the operation with priority on the display of the through-image for confirmation of the subject, that is, the control for executing the data transfer by the all-pixel driving with horizontal addition. Whether the former operation or the latter operation is to be executed is determined in accordance with the image capturing conditions, such as the exposure time and the focusing lens movement time corresponding to the zoom magnification. Thereby, it is possible to flexibly select and execute the operation matching with the image capturing condition.

In the above description, the determination based on the comparison between the exposure time and the determination value (i.e. the data transfer time by the partial extraction driving) is combined with the determination based on the comparison between the lens movement time corresponding to the zoom magnification and the transfer time. Alternatively, only one of the determinations may be executed, and the partial extraction driving (step A8) or the all-pixel driving with horizontal addition (step A9) may selectively be performed on the basis of the determination result.

Besides, in the above description, the determination value, which is to be compared with the exposure time and lens movement time, is set to be the transfer time in the case of transferring pixel data from the CCD 12 by the partial extraction driving. However, it should suffice if the ratio of the exposure time to the detection interval of the contract value is determined. Thus, the above-mentioned determination value may be set in accordance with the data transfer time (first transfer time) of pixel data by the all-pixel driving with horizontal addition.

SECOND EMBODIMENT

In the first embodiment, the camera 1 automatically switches the driving control for data transfer in the AF process between the partial extraction driving and the all-pixel driving with horizontal addition, on the basis of the exposure time and the lens movement time corresponding to the zoom magnification. In a second embodiment of the invention, the photographer is able to set a determination value, which is used to determine the switching of the driving control, and a mode ("AF display mode") that indicates whether an operation with priority on the speed of the AF process or an operation with priority on the display of a through-image is to be executed.

Figure 8:
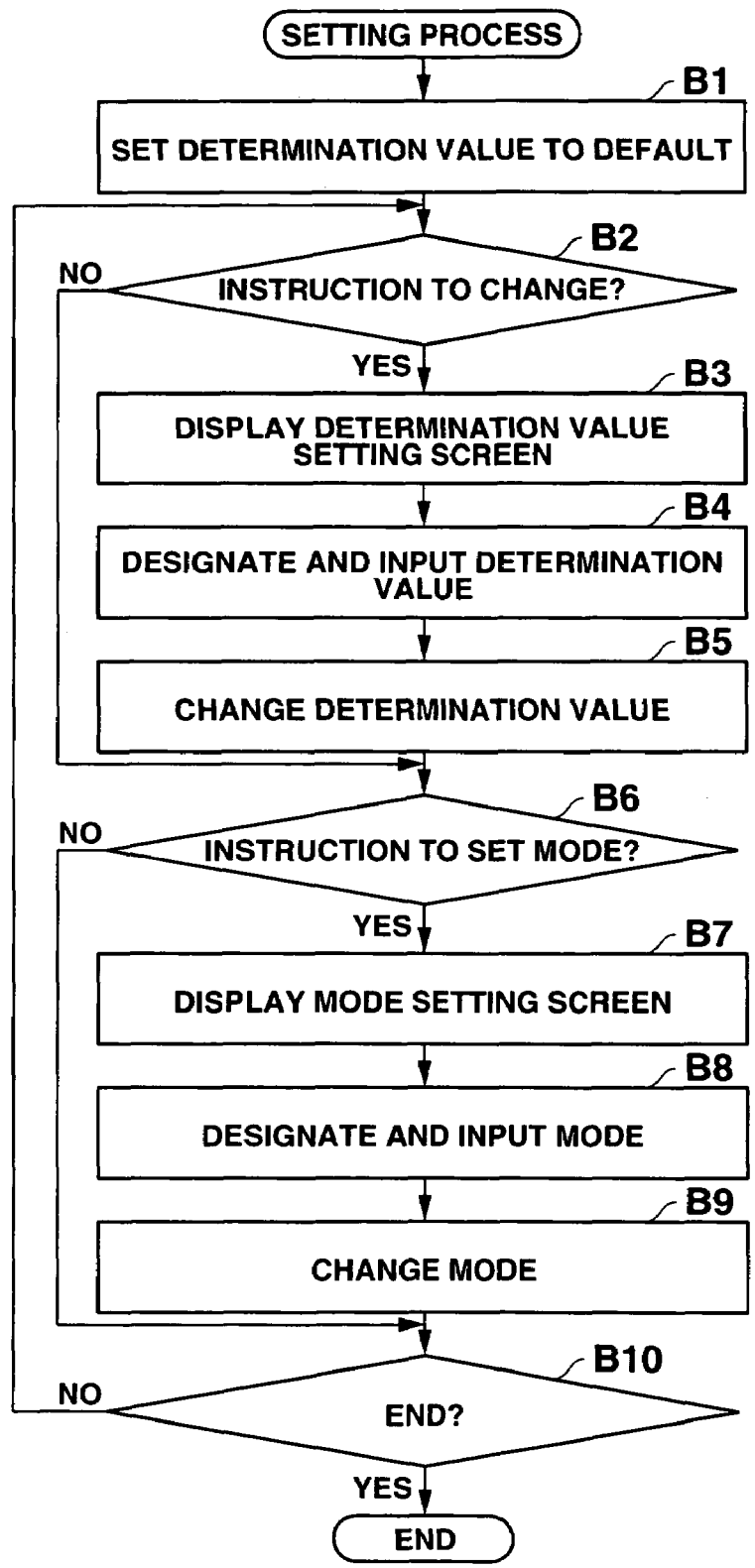
FIG. 8 is a flow chart for describing a setting process for setting a determination value or an AF display mode in a second embodiment of the invention.

A setting process for setting the determination value or the AF display mode in the second embodiment is described with reference to a flow chart of FIG. 8.

To start with, if execution of the setting process is instructed from a displayed menu by the operation of a menu key of the key entry unit 37, the controller 25 starts the setting process, and causes the display unit 29 to display a determination value setting screen and sets the determination value (e.g. data transfer time by the partial extraction driving), which is used to determine the switching of the driving control of the CCD 12 in the AF process, to a preset default value (step B1).

Figure 9A:
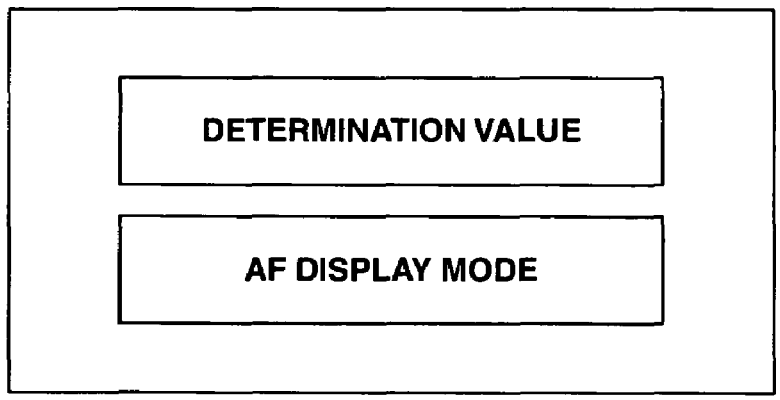
FIG. 9A, FIG. 9B and FIG. 9C show examples of the display screen during the setting process in the second embodiment.

FIG. 9A shows an example of the determination value setting screen. As shown in FIG. 9A, the determination value setting screen includes selection items for selection between the determination value, which is to be compared with the exposure time and lens movement time, and the AF display mode.

If a request for changing the determination value is input through the determination value setting screen by the photographer's operation of the key entry unit 37 (Yes in step B2), the controller 25 causes the display unit 29 to display a determination value setting screen (step B3).

Figure 9B:
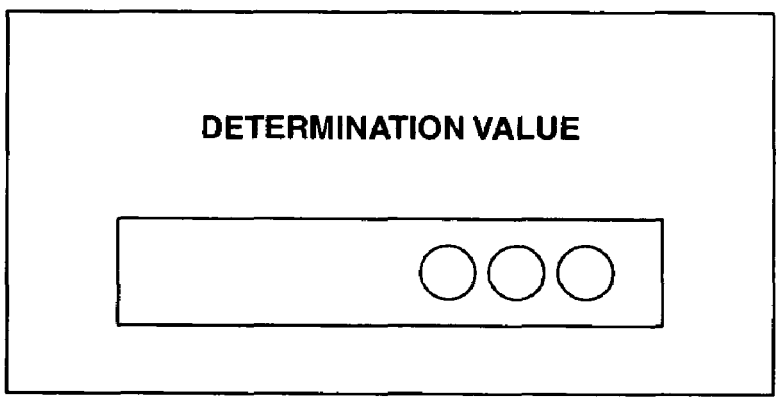

FIG. 9B shows an example of the determination value setting screen. As shown in FIG. 9B, the determination value setting screen includes an input field for inputting a determination value, which is to be compared with the exposure time and lens movement time.

The photographer can arbitrarily input a determination value by operating the key entry unit 37. For example, a software keyboard (numeral keys) for inputting numerals is displayed. By designating numerals on the keyboard by the operation of a cursor key, numerical values are directly input. Alternatively, a table of selectable preset determination values may be displayed, and any one of the preset determination values may be designated and input.

If the determination value is input, the controller 25 changes the preset default determination value to the newly input determination value, and stores the newly input determination value (step B5).

On the other hand, if a request for changing the AF display mode is input through the determination value setting screen by the photographer's operation of the key entry unit 37 (Yes in step B6), the controller 25 causes the display unit 29 to display a mode setting screen (step B7).

Figure 9C:
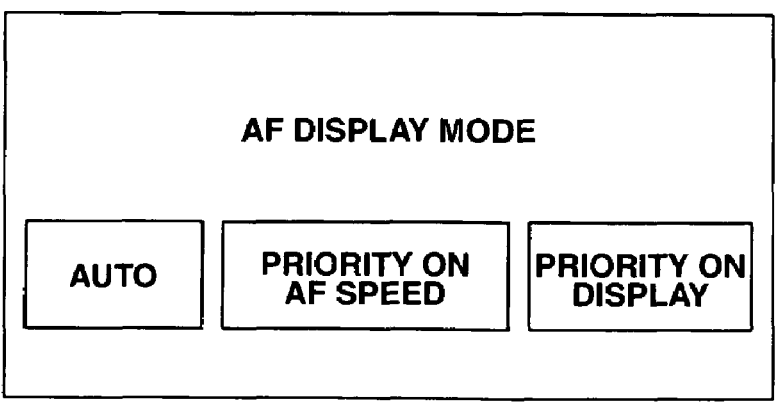

FIG. 9C shows an example of the mode setting screen. As shown in FIG. 9C, the mode setting screen includes selection items, "AUTO", "PRIORITY ON AF SPEED", and "PRIORITY ON DISPLAY". "AUTO" is an item for designating an operation mode (the same operation as in the first embodiment) in which the image capturing condition is discriminated on the basis of the comparison between the determination value, on the one hand, and the exposure time and lens movement time, on the other hand, and the driving method of the CCD 12 is automatically changed. "PRIORITY ON AF SPEED" is an item for designating an operation mode with priority on the speed of the AF process, and "PRIORITY ON DISPLAY" is an item for designating an operation mode with priority on the display of the through-image.

The photographer can arbitrarily designate one of these items by operating the key entry unit 37 (cursor key).

One of the items is thus selected to designate the operation mode (step B8), and the controller 25 changes the AF display mode to the newly designated one and stores the newly designated mode (step B9).

In this manner, the photographer can arbitrarily set the determination value and the AF display mode in advance. If the end of the setting process is instructed (step B10), the controller 25 finishes the setting process operation.

In the above-described setting of the determination value, the determination value is commonly used for comparison with the exposure time and lens movement time. Alternatively, determination values may individually be set for comparison with the exposure time and lens movement time.

Figure 10:
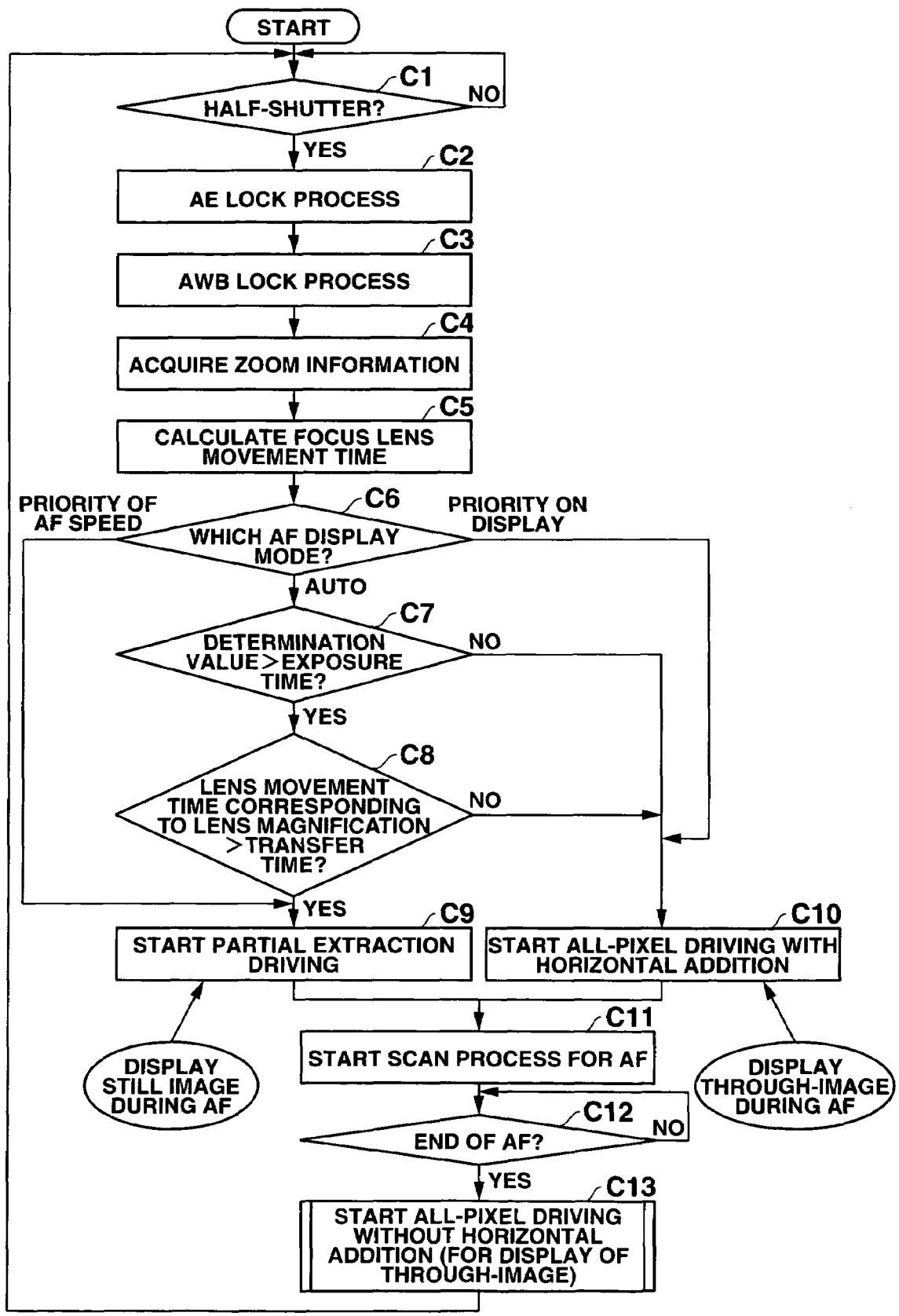
FIG. 10 is a flow chart for describing the AF process operation in the second embodiment.

Next, the AF process operation in the second embodiment is described with reference to a flow chart of FIG. 10. In the AF process operation of the second embodiment, the process is executed in accordance with the settings by the above-described setting process. Steps C1 to C5 and steps C9 to C13 in the flow chart of FIG. 10 correspond to steps A1 to A5 and steps A8 to A12 in the flow chart of FIG. 2 which has been described in connection with the first embodiment, and the same processes are carried out in these steps. Thus, an overlapping description is omitted here.

Upon detecting the half-push (half-shutter) of the shutter key, the controller 25 executes a series of processes (steps C1 to C5) and discriminates the AF display mode which is preset by the setting process (step C6).

If the operation mode of "PRIORITY ON AF SPEED" is set, the photographer prefers the decrease in the time that is needed for the AF process, to the display of the through-image. Thus, the CCD 12 is controlled to start the partial extraction driving (step C9). Since the subsequent operation is the same as in the first embodiment, a description is omitted.

If the operation mode of "PRIORITY ON DISPLAY" is set, the photographer prefers the display of the through-image, even if a certain length of time is needed for the AF process. Thus, the CCD 12 is controlled to start the all-pixel driving with horizontal addition (4/20 line read-out mode (with horizontal addition) illustrated in part A of FIG. 4) (step C10). Since the subsequent operation is the same as in the first embodiment, a description is omitted.

If the "AUTO" operation mode is set, the controller 25 executes, like the first embodiment, determination on the exposure time and lens movement time, using the determination value that is set in the setting process, and executes a control, on the basis of the determination result, to perform data transfer by the partial extraction driving or the all-pixel driving with horizontal addition (step C7, C8). Since the subsequent operation is the same as in the first embodiment, a description is omitted.

As has been described above, in the second embodiment, the control can be switched in accordance with the AF display mode that is set by the photographer in the setting process, that is, the "PRIORITY ON AF SPEED" mode in which the AF process can be executed in a short time period, or the "PRIORITY ON DISPLAY" mode in which the through-image can always be displayed even when the AF process is being executed. Therefore, the operability that is desired by the photographer can be provided.

The present invention is not limited to the camera 1 that has been described in connection with the above embodiments. The invention is also applicable to apparatuses having image capturing devices with AF functions, such as a mobile phone with an image capturing function, a timepiece with an image capturing function, a PDA (personal digital assistant) with an image capturing function, a video camera with a still image capturing function, and a personal computer with a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera which executes autofocus adjustment using pixel data acquired from an image capturing device, comprising:

a first transfer unit which transfers, in a first transfer time, pixel data of a first pixel range of a plurality of pixel data that are acquired by exposure of the image capturing device;

a second transfer unit which transfers, in a second transfer time that is shorter than the first transfer time, pixel data of a second pixel range of the plurality of pixel data that are acquired by exposure of the image capturing device, a number of pixels of the second pixel range being less than a number of pixels of the first pixel range;

a first control unit which causes the first transfer unit to successively transfer the pixel data, and which successively updates a display screen for conformation of a subject based on the pixel data that is successively transferred by the first transfer unit, and which controls the autofocus adjustment based on the pixel data that is successively transferred by the first transfer unit;

a second control unit which causes the second transfer unit to successively transfer the pixel data, and which interrupts the updating of the display screen for the conformation of the subject while the pixel data is being transferred by the second transfer unit, and which controls the autofocus adjustment based on the pixel data that is successively transferred by the second transfer unit; and a control determination unit which determines whether the autofocus adjustment is to be controlled by the first control unit or the second control unit, wherein the control determination unit comprises:

an exposure time adjusting unit which adjusts an exposure time of the image capturing device;

a determination unit which determines whether the exposure time, which is adjusted by the exposure time adjusting unit, is shorter than a first predetermined time; and a third control unit which causes the second control unit to execute the operation of the second control unit if the determination unit determines that the exposure time is shorter than the first predetermined time, and which causes the first control unit to execute the operation of the first control unit if the determination unit determines that the exposure time is not shorter than the first predetermined time.

2. The camera according to claim 1, wherein the first predetermined time is set in accordance with one of a transfer time by the first transfer unit and a transfer time by the second transfer unit.

3. The camera according to claim 1, further comprising:

an input unit which inputs designation of the first predetermined time; and a time setting unit which sets the first predetermined time in accordance with the designation that is input by the input unit.

4. A camera which executes autofocus adjustment using pixel data acquired from an image capturing device, comprising:

a first transfer unit which transfers, in a first transfer time, pixel data of a first pixel range of a plurality of pixel data that are acquired by exposure of the image capturing device;

a second transfer unit which transfers, in a second transfer time that is shorter than the first transfer time, pixel data of a second pixel range of the plurality of pixel data that are acquired by exposure of the image capturing device, a number of pixels of the second pixel range being less than a number of pixels of the first pixel range;

a first control unit which causes the first transfer unit to successively transfer the pixel data, and which successively updates a display screen for conformation of a subject based on the pixel data that is successively transferred by the first transfer unit, and which controls the autofocus adjustment based on the pixel data that is successively transferred by the first transfer unit;

a second control unit which causes the second transfer unit to successively transfer the pixel data, and which interrupts the updating of the display screen for the conformation of the subject while the pixel data is being transferred by the second transfer unit, and which controls the autofocus adjustment based on the pixel data that is successively transferred by the second transfer unit; and a control determination unit which determines whether the autofocus adjustment is to be controlled by the first control unit or the second control unit, wherein in the autofocus adjustment, a contrast value of the pixel data is detected when a focusing lens, which is moved, reaches a plurality of positions which are determined under a predetermined condition, wherein the control determination unit includes a time determination unit which determines whether a movement time of the focusing lens between the respective positions in the autofocus adjustment is shorter than a second predetermined time, which is set in accordance with the transfer time by the first transfer unit or the transfer time by the second transfer unit, and wherein the control determination unit causes the second control unit to execute the operation of the second control unit if the time determination unit determines that the movement time of the focusing lens is shorter than the second predetermined time, and causes the first control unit to execute the operation of the first control unit if the time determination unit determines that the movement time of the focusing lens is not shorter than the second predetermined time.

5. The camera according to claim 4, wherein the predetermined condition is a detection interval of a contrast value for obtaining a predetermined focus precision.

6. The camera according to claim 4, further comprising a zoom unit which adjusts a zoom magnification, wherein the time determination unit determines whether the movement time of the focusing lens between the respective positions, which varies in accordance with the zoom magnification adjusted by the zoom unit, is shorter than the second predetermined time, which is set in accordance with the transfer time by the first transfer unit or the transfer time by the second transfer unit.

7. A camera which executes autofocus adjustment using pixel data acquired from an image capturing device, comprising:

a first transfer unit which transfers, in a first transfer time, pixel data of a first pixel range of a plurality of pixel data that are acquired by exposure of the image capturing device;

a second transfer unit which transfers, in a second transfer time that is shorter than the first transfer time, pixel data of a second pixel range of the plurality of pixel data that are acquired by exposure of the image capturing device, a number of pixels of the second pixel range being less than a number of pixels of the first pixel range;

a first control unit which causes the first transfer unit to successively transfer the pixel data, and which successively updates a display screen for conformation of a subject based on the pixel data that is successively transferred by the first transfer unit, and which controls the autofocus adjustment based on the pixel data that is successively transferred by the first transfer unit;

a second control unit which causes the second transfer unit to successively transfer the pixel data, and which interrupts the updating of the display screen for the conformation of the subject while the pixel data is being transferred by the second transfer unit, and which controls the autofocus adjustment based D on the pixel data that is successively transferred by the second transfer unit;

a control determination unit which determines whether the autofocus adjustment is to be controlled by the first control unit or the second control unit; and a third transfer unit which transfers, in a third transfer time that is longer than the first transfer time, pixel data of a third pixel range of the plurality of pixel data that are acquired by the exposure of the image capturing device, a number of pixels of the third pixel range being greater than the number of pixels of the first pixel range; and a unit which causes, in a state in which the autofocus adjustment is not executed, the third transfer unit to successively transfer the pixel data, and successively updates the display screen for conformation of the subject based on the pixel data that is successively transferred by the third transfer unit.

* * * * *